United States Patent
Franca et al.

(10) Patent No.: US 10,071,837 B2
(45) Date of Patent: Sep. 11, 2018

(54) FITMENT WITH VALVE AND ETHYLENE/A-OLEFIN MULTI-BLOCK COPOLYMER

(71) Applicant: Dow Global Technologies LLC, Midland, MI (US)

(72) Inventors: Marcos P. Franca, Sao Paulo (BR); Bruno R. Pereira, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 68 days.

(21) Appl. No.: 14/871,129

(22) Filed: Sep. 30, 2015

(65) Prior Publication Data

US 2017/0088318 A1  Mar. 30, 2017

(51) Int. Cl.

| B65D 35/00 | (2006.01) |
|---|---|
| B65D 47/20 | (2006.01) |
| C08F 293/00 | (2006.01) |
| B65D 75/58 | (2006.01) |
| B65D 75/00 | (2006.01) |

(52) U.S. Cl.
CPC ........ B65D 47/2031 (2013.01); C08F 293/00 (2013.01); *B65D 75/008* (2013.01); *B65D 75/5883* (2013.01); *B65D 2575/583* (2013.01)

(58) Field of Classification Search
CPC .......................... B65D 47/2031; C08F 293/00
USPC ......................................................... 222/107
See application file for complete search history.

(56) References Cited

U.S. PATENT DOCUMENTS

| 5,115,950 | A | 5/1992 | Rohr |
| 5,783,638 | A | 7/1998 | Lai et al. |
| 6,050,451 | A * | 4/2000 | Hess, III ............... B65D 5/746 105/107 |
| 6,273,307 | B1 * | 8/2001 | Gross ................. B65D 75/5883 220/613 |
| 6,612,466 | B1 * | 9/2003 | Malin ..................... B29C 65/18 222/107 |
| 6,860,406 | B2 * | 3/2005 | Kobetsky ............... B29C 65/18 222/107 |
| 7,608,668 | B2 | 10/2009 | LiPiShan et al. |
| 7,858,706 | B2 | 12/2010 | Arriola et al. |
| 7,893,166 | B2 | 2/2011 | Shan et al. |
| 7,947,793 | B2 | 5/2011 | Marchand et al. |

(Continued)

FOREIGN PATENT DOCUMENTS

| EP | 1671894 A1 | 6/2006 |
| EP | 1716190 B1 | 12/2008 |
| EP | 2489601 A1 | 8/2012 |

OTHER PUBLICATIONS

Rouette, Hans-Karl. (2001). Encyclopedia of Textile Finishing. Woodhead Publishing. Section B, pp. 39-76.*

(Continued)

*Primary Examiner* — Jeremy W Carroll
(74) *Attorney, Agent, or Firm* — Husch Blackwell LLP

(57) ABSTRACT

The present disclosure provides a fitment. In an embodiment, a fitment is provided and includes a top portion, a base, and a channel extending through the top portion and the base for passage of a flowable material. The fitment includes a flexible valve extending across the channel. The flexible valve includes a slit which opens to permit flow therethrough. The flexible valve includes an ethylene/α-olefin multi-block copolymer.

20 Claims, 6 Drawing Sheets

(56) References Cited

U.S. PATENT DOCUMENTS

| | | | |
|---|---|---|---|
| 8,459,512 B2* | 6/2013 | Arvizu | B65D 47/243 215/311 |
| 8,474,665 B2* | 7/2013 | Arvizu | B65D 47/243 215/311 |
| 2002/0148857 A1* | 10/2002 | Savage | B65D 75/5877 222/107 |
| 2006/0201976 A1 | 9/2006 | Bloom et al. | |
| 2008/0247684 A1* | 10/2008 | Binks | B65D 47/2031 383/113 |
| 2010/0203300 A1* | 8/2010 | Coulter | B41M 5/267 428/195.1 |
| 2013/0026677 A1* | 1/2013 | Smith | B29C 45/0046 264/255 |
| 2014/0054330 A1* | 2/2014 | Feriani | B65D 51/1644 222/494 |
| 2015/0147460 A1 | 5/2015 | Dzikowicz et al. | |

OTHER PUBLICATIONS

Dobrynin, J. Chem. Phys., vol. 107, No. 21, Dec. 1997, pp. 9234-9238.

Potemkin, Physical Review E, vol. 57, No. 6, Jun. 1998, pp. 6902-6912.

* cited by examiner

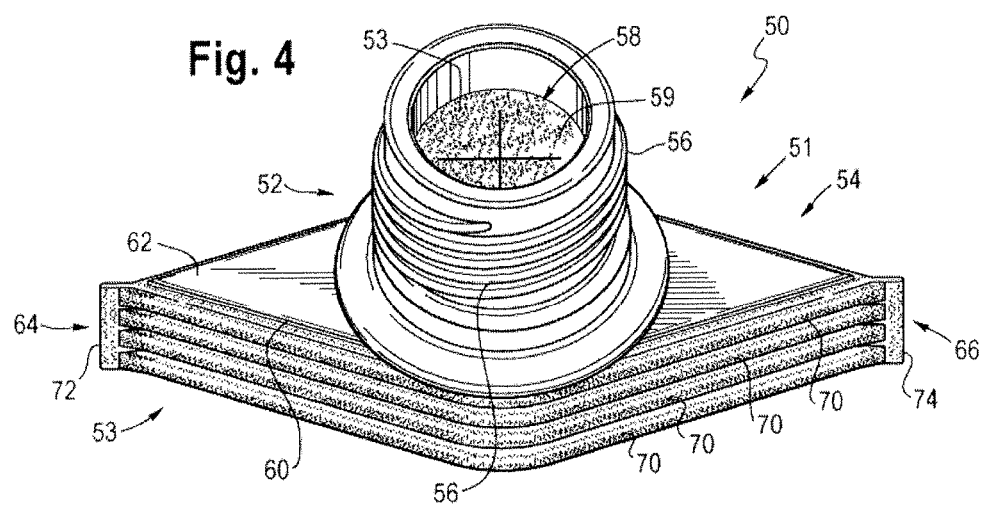
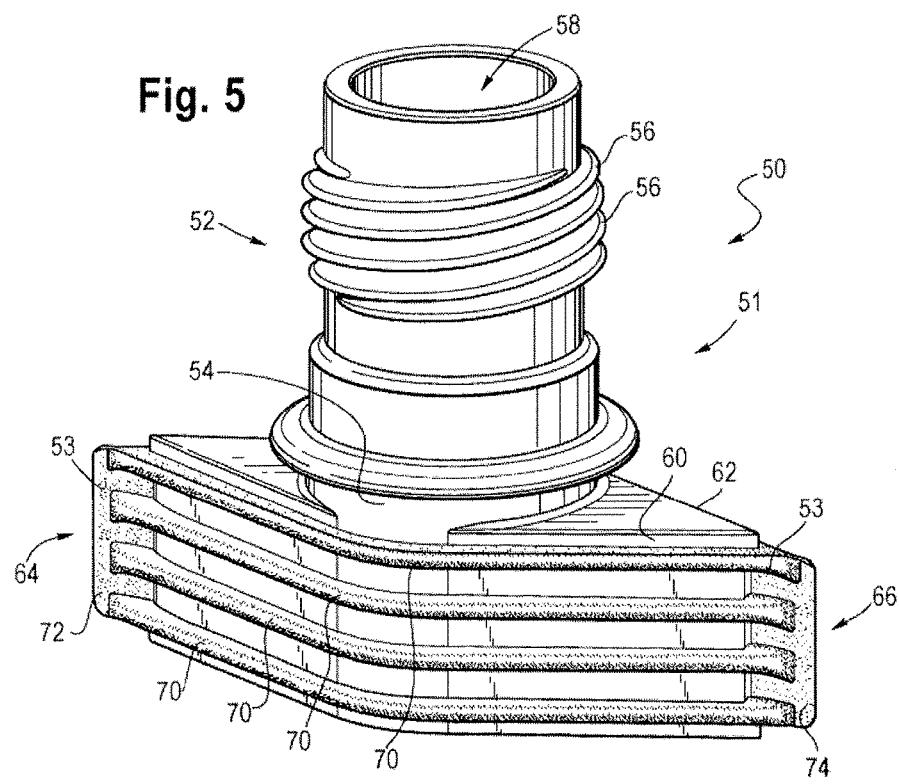

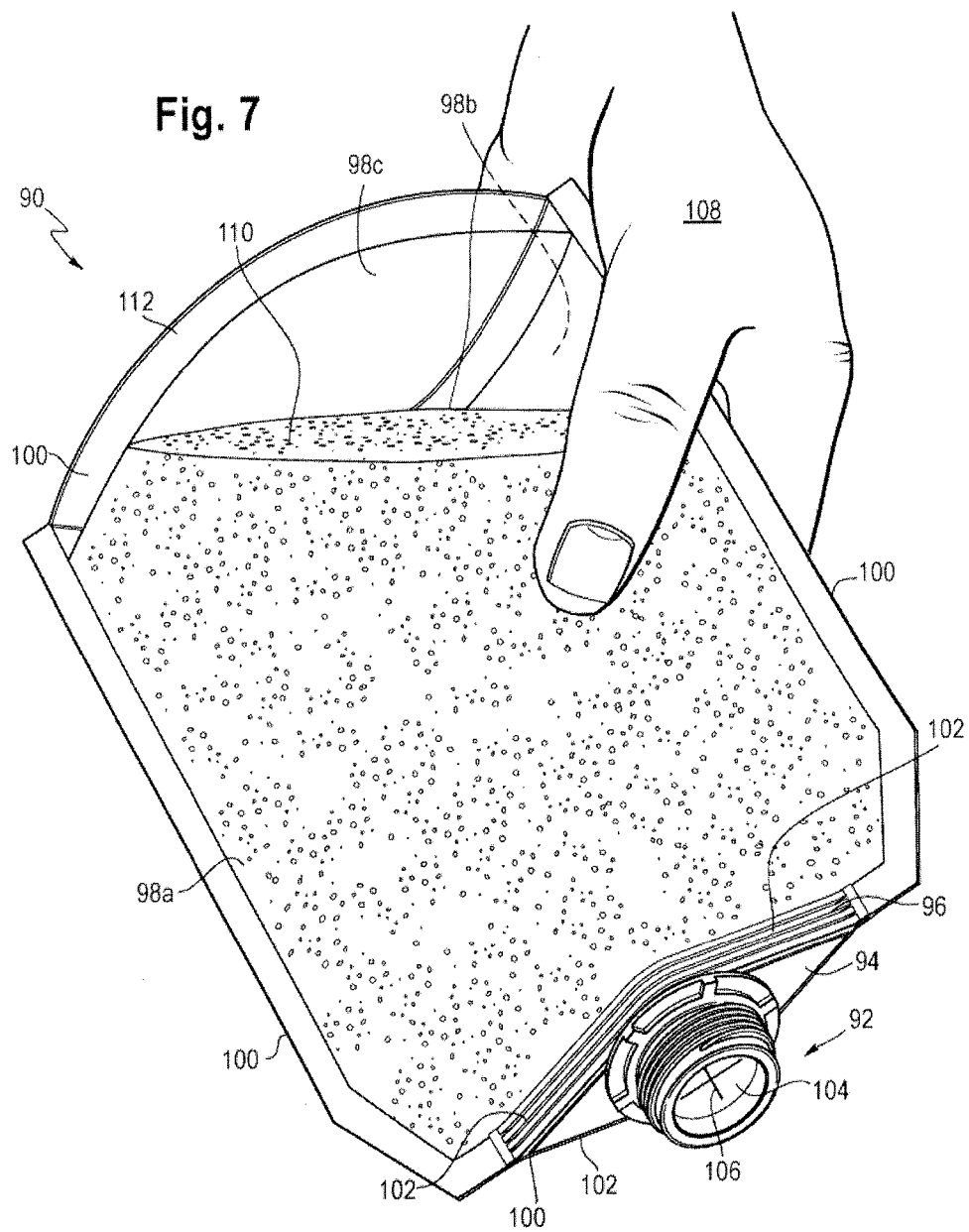

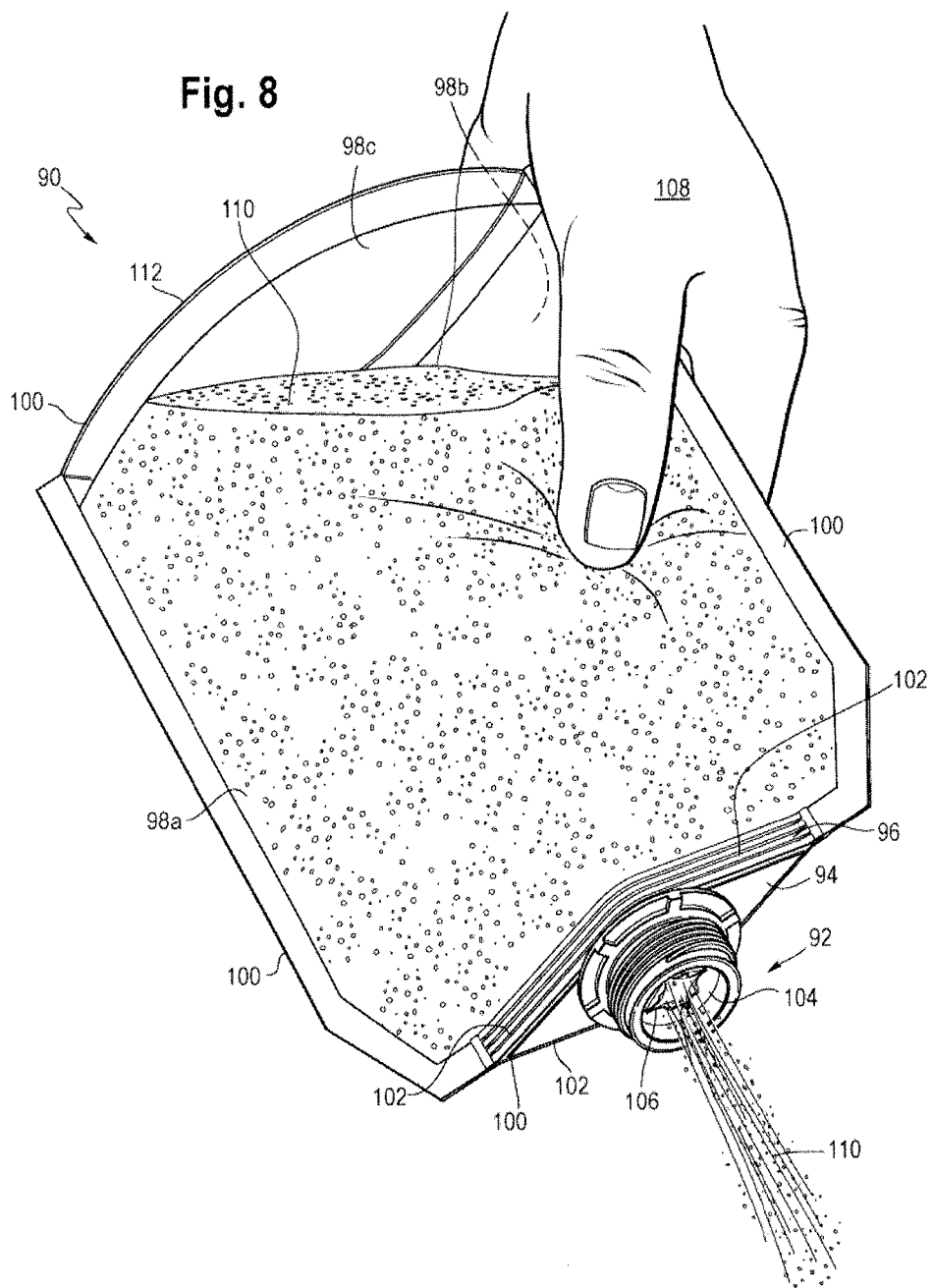

FITMENT WITH VALVE AND ETHYLENE/A-OLEFIN MULTI-BLOCK COPOLYMER

BACKGROUND

The present disclosure is directed to fitments for flexible containers.

Known are flexible pouches with fitments. A fitment is a rigid pour spout for delivery of flowable material from a flexible container or a flexible pouch. Such pouches are often referred to as "pour-pouches."

Known are flexible containers having fitments with flow control valves. Common are rigid fitments with a flow control valve made from a cross-linked elastomeric membrane, such as silicone, or butyl rubber, for example. The elastomeric membrane of the valve has to be manufactured independently from the fitment and subsequently fitted and assembled into the rigid fitment. The multiplicity of parts increases material costs. Production costs and resources are also increased because of the required numerous assembly steps for these multi-part fitments. As such, conventional rigid fitments with flow control valve are expensive, oftentimes making the fitment more expensive than the rest of the packaging and its contents. These constraints limit the number of packaging applications for this type of fitment.

A need therefore exists for a fitment for flexible containers with a flow control valve having few parts and few production steps. A need further exists for a fitment with flow control valve for use in low-cost flexible packaging applications.

SUMMARY

The present disclosure provides a fitment with a flexible valve composed of ethylene/α-olefin multi-block copolymer. The ethylene/α-olefin multi-block copolymer has sufficient elasticity to provide a flow control valve with similar performance, or improved performance, compared to conventional crosslinked elastomeric valve (membranes) such as silicone and/or butyl rubber.

The present disclosure provides a fitment. In an embodiment, a fitment is provided and includes a top portion, a base, and a channel extending through the top portion and the base for passage of a flowable material. The fitment includes a flexible valve extending across the channel. The flexible valve includes a slit which opens to permit flow therethrough. The flexible valve includes an ethylene/α-olefin multi-block copolymer.

The present disclosure provides a flexible container. In an embodiment, a flexible container is provided and includes a first multilayer film and a second multilayer film. Each multilayer film includes a seal layer. The multilayer films are arranged such that the seal layers oppose each other and the second multilayer film is superimposed on the first multilayer film. The flexible container includes a fitment sandwiched between the first multilayer film and the second multilayer film. The fitment includes a top portion, a base, and a channel extending through the top portion and the base. The channel allows for passage of a flowable material through the top portion and the base. The fitment includes a flexible valve extending across the channel. The flexible valve has a slit which opens to permit flow therethrough. The flexible valve includes an ethylene/α-olefin multi-block copolymer. The base is sealed to the first multilayer film and the second multilayer film.

BRIEF DESCRIPTION OF THE DRAWINGS

FIG. 4 is a top perspective view of a fitment in accordance with an embodiment of the present disclosure.

FIG. 5 is a perspective view of the fitment of FIG. 4.

FIG. 7 is a perspective view of a flexible container with a fitment in accordance with an embodiment of the present disclosure.

FIG. 8 is a perspective view of a flexible container with a fitment in accordance with an embodiment of the present disclosure.

DEFINITIONS

Figure 1:
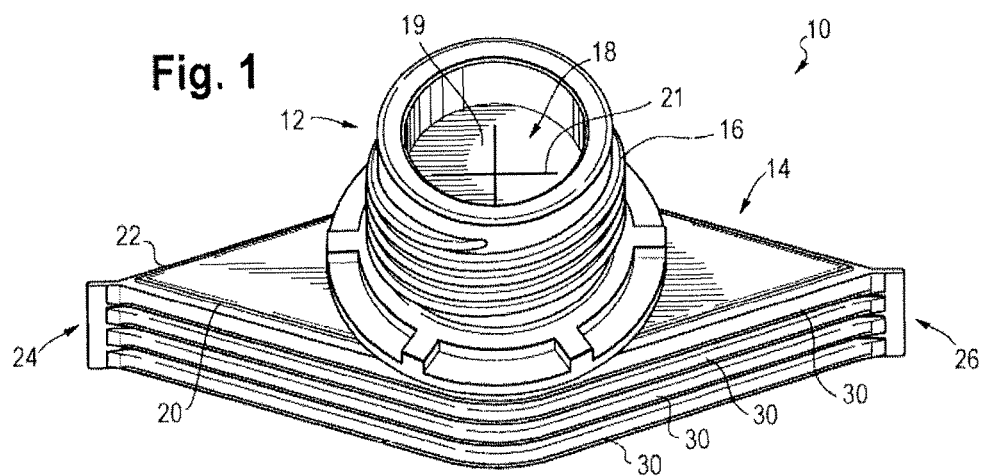
FIG. 1 is a top perspective view of a fitment in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all components and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all components and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

Elastic recovery is measured as follows. Stress-strain behavior in uniaxial tension is measured using an Instron™ universal testing machine at 300% min$^{-1}$ deformation rate at 21° C. The 300% elastic recovery is determined from a loading followed by unloading cycle to 300% strain, using ASTM D 1708 microtensile specimens. Percent recovery for all experiments is calculated after the unloading cycle using the strain at which the load returned to the base line. The percent recovery is defined as:

% Recovery=100*(Ef-Es)/Ef where Ef is the strain taken for cyclic loading and Es is the strain where the load returns to the baseline after the unloading cycle.

An "ethylene-based polymer," as used herein is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tm or "melting point" as used herein (also referred to as a melting peak in reference to the shape of the plotted DSC curve) is typically measured by the DSC (Differential Scanning Calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a fitment. In an embodiment, a fitment is provided and includes (i) a top portion and (ii) a base. A channel extends through the top portion and the base for passage of a flowable material. The fitment further includes (iii) a flexible valve extending across the channel. The flexible valve has a slit which opens to permit flow therethrough. The flexible valve is composed of an ethylene/α-olefin multi-block copolymer.

1. Fitment

Figure 2:
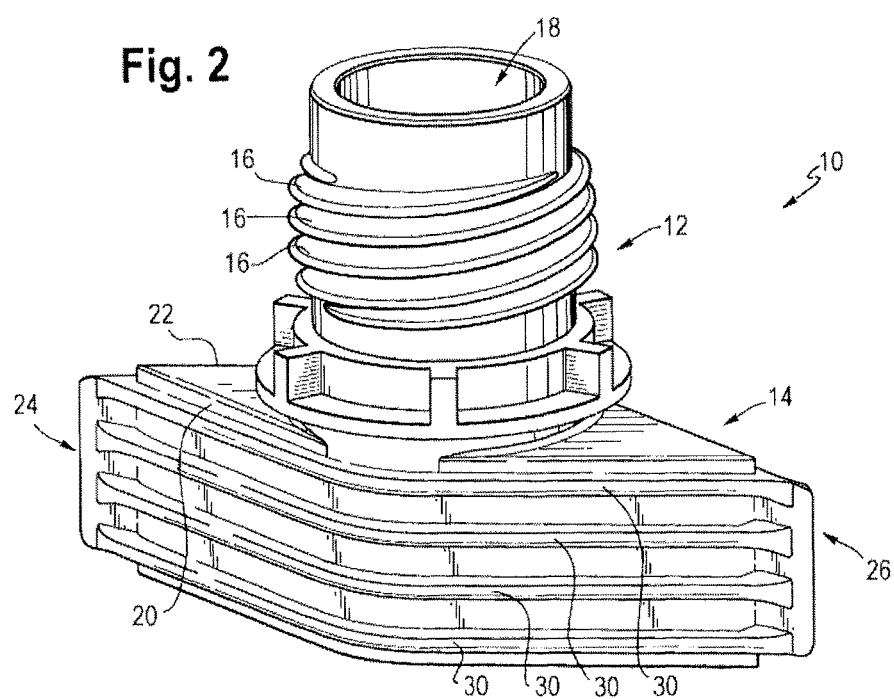
FIG. 2 is a perspective view of the fitment of FIG. 1.
Figure 3:
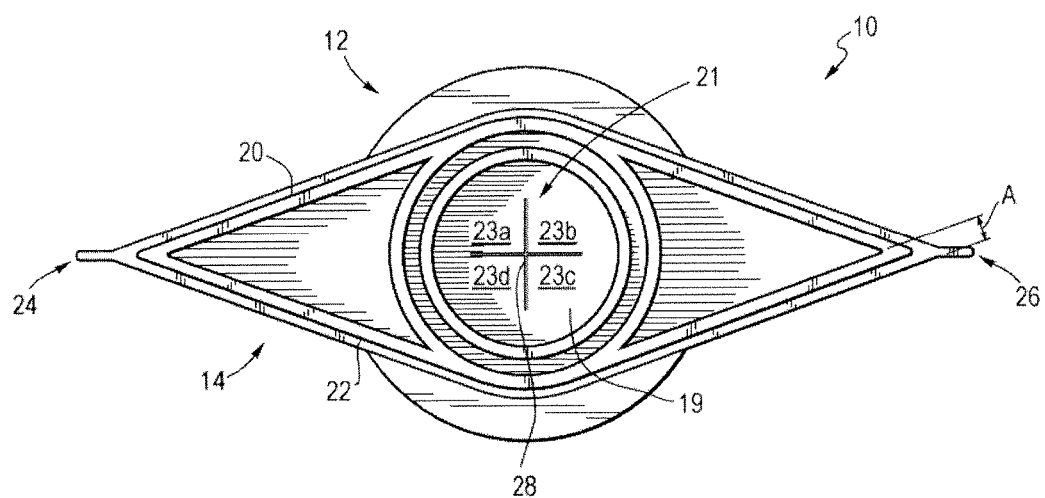
FIG. 3 is a bottom plan view of the fitment of FIG. 1.

In an embodiment, a fitment 10 is provided as shown in FIGS. 1-3. The fitment 10 has a top portion 12 and a base 14. The fitment 10 is composed of one or more (i.e., a blend) of polymeric materials. Nonlimiting examples of suitable polymeric materials include ethylene-based polymer, propylene-based polymer, and combinations thereof. The base 14 is structured to be placed between opposing flexible films and sealed to form a flexible container as will be discussed in detail below. The top portion 12 may include threads 16, or other structure, for securing a closure to the top portion.

The base 14 includes a pair of opposing sidewalls. Nonlimiting examples of suitable shapes formed by the sidewalls (when the fitment is viewed from bottom plan view) include circle, ellipse, polygon, and regular polygon (triangle, square, pentagon, hexagon, heptagon, octagon, etc.).

A channel 18 extends through the top portion 12 and the base 14. The channel 18 allows a flowable material to pass, or otherwise flow, through the fitment 10. A flexible valve 19 extends across the channel 18. The flexible valve 19 can be located anywhere along the length of the channel 18.

In an embodiment, the flexible valve 19 is located in the top portion 12. Alternatively, the flexible valve 19 is located in the base 14.

The flexible valve 19 controls the flow of a flowable material through the channel 18 as will be discussed in detail below. The shape of the flexible valve 19 can be flat, convex, or concave. The flexible valve 19 has a thickness from 0.1 mm, or 0.2 mm, or 0.3 mm, or 0.4 mm, or 0.5 mm to 0.6 mm, or 0.7 mm, or 0.8 mm, or 0.9 mm, or less than 1.0 mm, or 1.0 mm.

The flexible valve 19 includes a slit 21 which opens to permit flow therethrough. Although FIGS. 1 and 3 show slit 21 with four flaps 23a-23d, it is understood that the slit 21 can have from 2, or 3, or 4, or 5 to 6, or 7, or 8, or 9, or 10, or more flaps.

The flexible valve 19 is composed of, or otherwise is formed from, an ethylene/α-olefin multi-block copolymer.

The term "ethylene/α-olefin multi-block copolymer" is a copolymer that includes ethylene and one or more copolymerizable α-olefin comonomers in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

$$(AB)_n$$

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms, or 4 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, or 4 to 12 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the comonomer is selected from butene, hexene, and octene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;

and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or 125° C.;

(ii) a density from 0.86 g/cc, or 0.87 g/cc, or 0.88 g/cc to 0.89 g/cc;

(iii) 50-85 wt % soft segment and 40-15 wt % hard segment;

(iv) from 10 mol %, or 13 mol %, or 14 mol %, or 15 mol % to 16 mol %, or 17 mol %, or 18 mol %, or 19 mol %, or 20 mol % octene in the soft segment;

(v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;

(vi) a melt index (MI) from 1 g/10 min, or 2 g/10 min, or 5 g/10 min, or 7 g/10 min to 10 g/10 min, or 15 g/10 min, or 20 g/10 min, or 25 g/10 min, or 30 g/10 min;

(vii) a Shore A hardness from 65, or 70, or 71, or 72 to 73, or 74, or 75, or 77, or 79, of 80;

(viii) an elastic recovery (Re) from 50%, or 60% to 70%, or 80%, or 90%, at 300% min$^{-1}$ deformation rate at 21° C. as measured in accordance with ASTM D 1708; and (ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

The ethylene/α-olefin multi-block copolymer can be a sole component or can be blended with other olefin-based polymers. Nonlimiting examples of suitable olefin-based polymers as blend components include propylene-based polymer, LDPE, LLDPE, HDPE, and combinations thereof.

In an embodiment, the ethylene/octene multi-block copolymer is sold under the Tradename INFUSE™ is available from The Dow Chemical Company, Midland, Mich., USA. In a further embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

In an embodiment, the top portion 12, the base 14, and the flexible valve 19 form an integral component composed of ethylene/α-olefin multi-block copolymer. In a further embodiment, the integral component of top portion 12, the base 14, and the flexible valve 19 is a single unitary piece composed of a single ethylene/α-olefin multi-block copolymer.

In an embodiment, the base 14 includes opposing sidewalls 20, 22 that define a canoe-shape (when the fitment is viewed from bottom plan view) as shown in FIG. 3. Sidewalls 20, 22 extend around opposite sides of the channel 18 and join together to form opposing ends 24, 26. When the base 14 of the fitment 10 is sealed between two opposing flexible films, the shape of sidewalls 20, 22 and the shape of the ends 24, 26 allow for a gradual transition from opposing flexible films to a diametrical center 28 of the base 14.

In an embodiment, at least one sealing rib 30 (hereafter "sealing rib(s)") extends along sidewalls 20, 22. The sealing rib(s) 30 includes an ethylene/α-olefin multi-block copolymer.

In an embodiment, the cross-sectional shape of the sealing rib(s) is selected from semi-circular, trapezoidal, semi-elliptical, polygonal, and rectangular.

In an embodiment, a plurality of sealing ribs 30 extend around the sidewalls 20, 22 as shown in FIG. 1. Each sealing rib 30 includes the ethylene/α-olefin multi-block copolymer.

In an embodiment, the base 14 contains, or is otherwise formed from, an ethylene/α-olefin multi-block copolymer. The ethylene/α-olefin multi-block copolymer for the base 14 may be the same or different, than the ethylene/α-olefin multi-block copolymer for the sealing rib(s).

In an embodiment, the base is integral to the sealing rib(s). The base and the sealing rib(s) are composed of the same ethylene/α-olefin multi-block copolymer. In a further embodiment, the base and the sealing ribs are composed solely of a single ethylene/α-olefin multi-block copolymer.

In an embodiment, fitment 10 is an integral component as shown in FIGS. 1-3. The entire fitment 10 is formed from (wholly or partially) ethylene/α-olefin multi-block copolymer. The ethylene/α-olefin multi-block copolymer in the top portion 12, the base 14, the flexible valve 19, and the sealing rib(s) 30 can be the same or different. In a further embodiment, the top portion 12, the base 14, the flexible valve 19, and the sealing rib(s) 30 each is composed of the same ethylene/α-olefin multi-block copolymer. In yet a further embodiment, the top portion 12, the base 14, the flexible valve 19, and the sealing rib(s) 30 each is composed solely of the same ethylene/α-olefin multi-block copolymer that is a single ethylene/α-olefin multi-block copolymer.

In a further embodiment, the fitment 10 is an integral component and the top portion 12, the base 14, the flexible valve 19, and the sealing rib(s) 30 each is composed solely of a single ethylene/α-olefin multi-block copolymer.

In an embodiment, each sidewall 20, 22 has a wall thickness A (FIG. 3) from 0.2 mm, or 0.4 mm, or 0.6 mm, or 0.8 mm, or 1.0 mm, or 1.5 mm to 2.0 mm, or 2.5 mm, or 3.0 mm and each sealing rib 30 has a thickness (or rib height) that is from 1% or 10%, or 25%, or 50%, or 75% to 100%, or 110%, or 125%, or 150%, or 175%, or 200% of the thickness A.

2. Overmold Component

Figure 6:
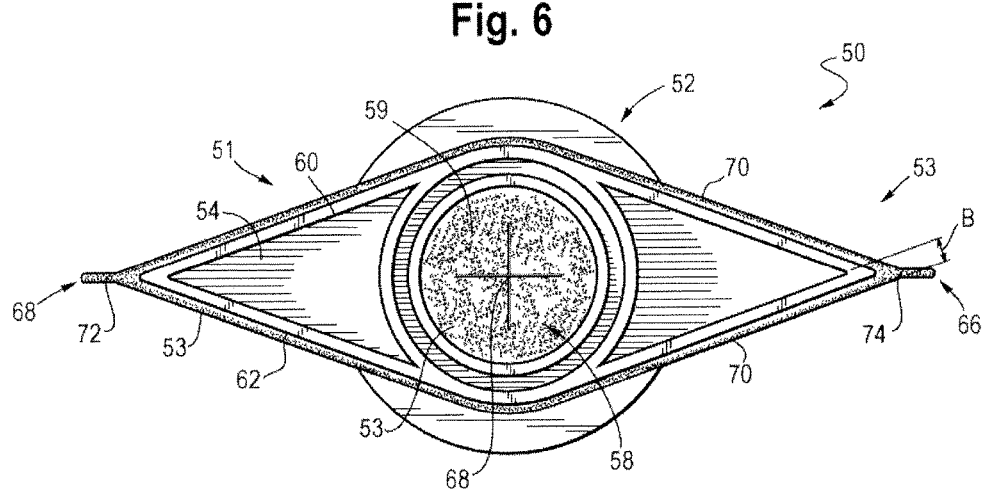
FIG. 6 is a bottom plan view of the fitment of FIG. 4.

In an embodiment, a fitment 50 is provided as shown in FIGS. 4-6. Fitment 50 includes a rigid component 51 and an overmold component 53. The rigid component 51 includes top portion 52 and a base 54 that are integral to each other. The top portion 52 and the base 54 are composed of, or otherwise formed from, a rigid polymeric material. Nonlimiting examples of suitable material for the rigid polymeric material include propylene-based polymer, ethylene-based polymer, and combinations thereof.

In an embodiment, the rigid component 51 is composed of, or is otherwise formed from, a polymeric material selected from high density polyethylene (HDPE), propylene homopolymer, propylene/ethylene copolymer (such as sold under the tradename VERSIFY), propylene impact copolymer, and combinations thereof.

The rigid component 51 also includes threads 56, and a channel 58. Sidewalls 60, 62 extend around opposite sides of the channel 58 and join together to form opposing ends 64, 66. From a bottom plan view, the sidewalls 60 and 62 form a canoe-shape as shown in FIG. 6. The diametrical center 68 of the base 54 is in the channel 58.

The fitment 50 includes overmold component 53. The term "overmolding" or "overmold component" refers to a component formed by a molding process in which two or more materials are combined to produce a single component. The overmolding process typically binds a rigid polymeric material with an elastomeric material although it is possible to overmold other polymeric materials. An overmolded component begins with the molding of a rigid, thermoplastic substrate. A thermoplastic elastomer (TPE) is then molded (i.e., "overmolded") on top of the rigid thermoplastic substrate, thereby binding the TPE to the rigid thermoplastic substrate.

Nonlimiting examples of suitable processes for overmolding include insert molding and multi-shot molding. Insert molding is a two-step process. First, the rigid substrate is molded. It is then placed in a mold cavity on another injection molding machine and TPE is shot directly over the substrate. In contrast, multi-shot molding is performed on an injection molding press that shoots multiple materials in a single operation. This allows the TPE to be overmolded immediately following the molding of the substrate.

In an embodiment, one or more ethylene/α-olefin multi-block copolymer(s) is overmolded onto the rigid component 51. The rigid component 51 is configured to receive (orifice(s), or holes, etc.) melted ethylene/α-olefin multi-block copolymer. The overmolding process injects, or otherwise introduces, the melted ethylene/α-olefin multi-block copolymer into the rigid component 51 to produce the flexible valve 59. The overmolded flexible valve 59 adheres to, or otherwise binds to, the rigid component 51. Once injected, the overmolded flexible valve 59 solidifies and extends across the channel 58.

In an embodiment, the overmolding process attaches to, or otherwise binds, ethylene/α-olefin multi-block copolymer onto the base 54 in a similar manner. The overmold 53 component includes sealing ribs 70 which bind to the sidewalls 60 and 62. The sealing ribs 70 extend radially outward from the base 54. The overmold component 53 also includes winglets 72 and 74 that are integral to the sealing ribs 70. The winglets 72 and 74 are composed of the ethylene/α-olefin multi-block copolymer and attach to, or otherwise bind to, the base 54 at respective ends 64, 66.

In an embodiment, the rigid component 51 excludes, or is otherwise void of, ethylene/α-olefin multi-block copolymer. In a further embodiment, the overmold component 53 is composed solely of ethylene/α-olefin multi-block copolymer. In yet a further embodiment, the overmold component 53 is composed solely of a single ethylene/α-olefin multi-block copolymer.

In an embodiment, each sidewall 60, 62 has a wall thickness B (FIG. 6) from 0.2 mm, or 0.4 mm, or 0.6 mm, or 0.8 mm, or 1.0 mm, or 1.5 mm to 2.0 mm, or 2.5 mm, or 3.0 mm; and each sealing rib 70 has a thickness (or rib height) from 0.4 mm, or 0.6 mm, or 0.8 mm, or 1.0 mm, or 1.2 mm, or 1.4 mm, or 1.6 mm, or 1.8 mm to 2.0 mm, or 2.2 mm, or 2.4 mm, or 2.6 mm, or 2.8 mm, or 3.0 mm.

In an embodiment, each sidewall 60, 62 has a wall thickness B from 0.2 mm, or 0.4 mm, or 0.6 mm, or 0.8 mm, or 1.0 mm, or 1.5 mm to 2.0 mm, or 2.5 mm, or 3.0 mm and the each sealing rib 70 has a thickness (or rib height) that is from 1%, or 10%, or 25%, or 50%, or 75% to 100%, or 110%, or 125%, or 150%, or 175%, or 200% the thickness B.

In an embodiment, the fitment includes a rigid component with (i) an inner portion composed of a material selected from HDPE and propylene-based polymer and combinations thereof, and (ii) an outer portion composed of an ethylene/α-olefin multi-block copolymer. The fitment also includes the overmold component composed solely of ethylene/α-olefin multi-block copolymer.

The fitment with the rigid component and the overmold component advantageously provides firm support by way of the rigid component and improved sealing performance from the overmold component and reduces the failure rate during the film sealing process.

3. Flexible Container

The present disclosure provides a flexible container. In an embodiment, a flexible container is provided and includes a first multilayer film and a second multilayer film. Each multilayer film includes a seal layer. The multilayer films are arranged such that the seal layers oppose each other and the second multilayer film is superimposed on the first multilayer film. The flexible container includes a fitment sandwiched between the first multilayer film and the second multilayer film. The fitment can be any fitment (fitment 10, fitment 50) as previously discussed herein. The fitment includes (i) a top portion and (ii) a base. A channel extends through the top portion and the base for passage of a flowable material. The fitment also includes (iii) a flexible valve extending across the channel. The flexible valve includes a slit which opens to permit flow therethrough. The flexible valve is composed of an ethylene/α-olefin multi-block copolymer. The fitment base is sealed to the first multilayer film and the second multilayer film.

The present flexible container includes a first multilayer film and a second multilayer film. It is understood the flexible container can include two, three, four, five, or six or more multilayer films. Each multilayer film is flexible and has at least two, or at least three layers. The flexible multilayer film is resilient, flexible, deformable, and pliable. The structure and composition for each multilayer film may be the same or different. For example, each of two opposing multilayer films can be made from a separate web, each web having a unique structure and/or unique composition, finish, or print. Alternatively, each multilayer film can be the same structure and the same composition.

In an embodiment, each multilayer film is a flexible multilayer film having the same structure and the same composition.

Each flexible multilayer film may be (i) a coextruded multilayer structure or (ii) a laminate, or (iii) a combination of (i) and (ii). In an embodiment, each flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical/optical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, ethylene vinyl acetate (EVA), ethylene ethyl acrylate (EEA), propylene-based plastomers or elastomers such as VERSIFY™ (The Dow Chemical Company), grafted olefin-based polymer (MAH-grafted), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C. to 30° C., or 40° C. or higher than the melting point of the polymer in the seal layer wherein the outer layer polymer is selected from resins such as AFFINITY™, LLDPE (DOWLEX™) VERSIFY™ or VISTAMAX, ELITE™, MDPE, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, propylene-based plastomers or elastomers such as VERSIFY™ (The Dow Chemical Company), grafted olefin-based polymer (MAH-grafted), and blends thereof. The flexible multilayer film also includes an outer layer that is a polyamide.

In an embodiment, the flexible multilayer film is a coextruded and/or laminated film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm³, or from 0.875 to 0.910 g/cm³, or from 0.888 to 0.900 g/cm³. The outer layer is composed of a material selected from LLDPE, OPET, OPP (oriented polypropylene), BOPP, polyamide, and combinations thereof.

In an embodiment, the flexible multilayer film is a coextruded and/or laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm³, or from 0.875 to 0.910 g/cm³, or from 0.888 to 0.900 g/cm³ and an outermost layer composed of a material selected from LLDPE, OPET, OPP (oriented polypropylene), BOPP, polyamide, and combinations thereof.

In an embodiment, the flexible multilayer film is a coextruded and/or laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm³, or from 0.875 to 0.910 g/cm³, or from 0.888 to 0.900 g/cm³. The outer layer is composed of a material selected from LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film is a coextruded and/or laminated five layer, or a coextruded (or laminated) seven layer film having at least one layer containing a material selected from LLDPE, OPET, OPP (oriented polypropylene), BOPP, and polyamide.

In an embodiment, the flexible multilayer film is a coextruded and/or laminated five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminated) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a $Tm_i$ from 90° C. to 106° C. The outer layer is a polyamide having a $Tm_o$ from 170° C. to 270° C. The film has a $\Delta Tm$ ($\Delta Tm = Tm_o - Tm_i$) from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

In an embodiment, a flexible container 90 is provided as shown in FIGS. 7 and 8. The flexible container 90 includes a fitment 92 that is sandwiched, or otherwise placed between, two opposing multilayer films. The multilayer films can be any flexible multilayer film as previously disclosed herein. The fitment 92 can be either fitment 10 or fitment 50 as previously disclosed herein, wherein the fitment 92 includes base 94 and at least one sealing rib 96 composed of ethylene/α-olefin multi-block copolymer. The base 94 is sandwiched between, or otherwise is positioned between, respective seal layers of the opposing multilayer films. Although FIGS. 7-8 show flexible container 90 with first multilayer film 98a (front layer), second multilayer film 98b (rear layer), and gusset panel 98c, it is understood the flexible container 90 can have different structures and different configurations. The second multilayer film 98b is superimposed on the first multilayer film. Each multilayer film has a respective seal layer containing an olefin-based polymer. The respective seal layers contact the base 94.

The opposing multilayer films (with fitment base therebetween) are sealed around a common peripheral edge 100. The flexible container 90 includes a fitment seal 102 located along at least a portion of the peripheral edge 100. The fitment seal 102 includes the base 94 sandwiched between front multilayer film 98a, and the rear multilayer film 98b.

The fitment seal 102 is formed by a heat seal process. The term "heat seal process" or "heat sealing," as used herein, is the act of placing two or more films of polymeric material between opposing heat seal bars, the heat seal bars moved toward each other, sandwiching the films, to apply heat and pressure to the films such that opposing interior surfaces (seal layers) of the films contact, melt, and form a heat seal, or weld, to attach the films to each other. Heat sealing includes suitable structure and mechanism to move the seal bars toward and away from each other in order to perform the heat sealing procedure.

The fitment seal 102 is composed of, or otherwise formed from, (i) the ethylene/α-olefin multi-block copolymer (from the sealing rib(s)), (ii) the olefin-based polymer (from the seal layer), or (iii) a combination of (i) and (ii). Applicant surprisingly discovered that the present fitment 92 (either fitment 10 or fitment 50) having sealing rib(s) composed of the present ethylene/α-olefin multi-block copolymer deforms during the heat seal process and recovers (recoils) after completion of the heat seal process to improve the seal between the base and the films. The present fitment reduces the incidence of leaks in the fitment seal 102.

In an embodiment, the fitment seal 102 is a hermetic seal.

In an embodiment, the fitment seal 102 is a hard seal. A "hard seal," as used herein, is a heat seal that is not manually separable without destruction of the film. A hard seal is different than a frangible seal. A "frangible seal," as used herein, is a heat seal that is manually separable (or peelable) without destruction of the film. In general, a frangible seal is designed to be separable or openable with application of finger pressure or hand pressure to the seal. A hard seal is designed to remain intact with application of finger pressure or hand pressure to the seal.

The flexible container 90 includes a fitment 92. The fitment 92 can be any fitment (fitment 10 or fitment 50) as previously disclosed herein. In an embodiment, the fitment 90 includes flexible valve 104 and slit 106 as shown in FIGS. 7 and 8. The slit 106 remains closed, unless a threshold internal pressure is applied to the flexible valve 104. When a pressure is applied to the flexible container that exceeds the threshold pressure, such as a squeeze by a person's hand for example, the fluid contents (i.e., the flowable material) in the flexible container forces open the slit 106, thereby enabling the flowable material contents to exit the container interior through the fitment 92.

In this way, the flexible valve 104 keeps the flowable material contents within the flexible container 90, even when the flexible container is in an inverted position, such as when the fitment 92 is pointed in a downward direction, as shown in FIG. 7. A squeezing force applied by a person's hand 108, for example (FIG. 8), can be sufficient to impart the requisite threshold pressure in order to open the slit 106 and discharge flowable material 110 from the interior of flexible container 90.

In an embodiment, the flexible valve is located in the top portion of the fitment 92. With the flexible valve in the fitment top portion, the risk of damage to the flexible valve during the heat sealing process is reduced, or eliminated.

The present flexible container 90 can be a box pouch, pillow pouch, spout k-sealed pouch, spout side gusseted pouch or a stand up pouch. The location of the fitment installed into the flexible container can be anywhere a seal exists between two opposing films, i.e., on top, side, or even on bottom in the seal of a bottom gusset to a front panel, for example. In other words, the fitment seal 102 can be located, or otherwise formed, on the flexible container anywhere where two or more films meet and are heat sealed together. Nonlimiting examples of suitable locations for the fitment seal 102 include top, bottom, side, corner, gusset areas of the flexible container.

The present flexible container can be formed with handles or without handles.

In an embodiment, the present flexible container 90 is a stand up pouch (SUP). The stand up pouch includes gusset panel 98c. The gusset panel 98c includes a gusset rim 112. The gusset panel 98c is made from a multilayer film with the same structure and composition as the multilayer films. The gusset panel 98c provides (1) the structural integrity to support the SUP and its contents without leakage, and (2) the stability for the SUP to stand upright (i.e., base on a support surface, such as a horizontal surface, or a substantially horizontal surface), without tipping over. In this sense, the pouch is a "stand up" pouch.

In an embodiment, the gusset panel 98c is an extension of one or both of the multilayer films. A folding procedure forms the gusset panel from one, or both, of the multilayer films.

The gusset rim 112 defines a footprint for the SUP. The footprint can have a variety of shapes. Nonlimiting examples of suitable shapes for the footprint include circle, square, rectangle, triangle, oval, ellipsoid, eye-shape, and teardrop. In a further embodiment, the shape of the footprint is ellipsoid.

In an embodiment, the present flexible container includes a closure. Although FIGS. 1-2, 4-5, and 7-8 show threads for a screw-on type closure (for use with a mated screw-on cap), it is understood that the fitment 92 (i.e., fitment 10 or fitment 50) may embody other closure systems. Nonlimiting examples of suitable closures, include, screw cap, flip-top cap, snap cap, liquid or beverage dispensing fitments (stopcock or thumb plunger), Colder fitment connector, tamper evident pour spout, vertical twist cap, horizontal twist cap, aseptic cap, vitop press, press tap, push on tap, lever cap, conro fitment connector, and other types of removable (and optionally reclosable) closures. The closure and/or fitment may or may not include a gasket.

In an embodiment, the flexible container 90 has a volume from 0.05 liters (L), or 0.1 L, or 0.25 L, or 0.5 L, or 0.75 L, or 1.0 L, or 1.5 L, or 2.5 L, or 3 L, or 3.5 L, or 4.0 L, or 4.5 L, or 5.0 L to 6.0 L, or 7.0 L, or 8.0 L, or 9.0 L, or 10.0 L, or 20 L, or 30 L.

In an embodiment, the present flexible container is made from 90 wt % to 100 wt % ethylene-based polymer. Weight percent is based on total weight of the flexible container (without content). The flexible container made from 90 wt % to 100 wt % ethylene-based polymer is advantageous as it is readily recyclable.

The present flexible container is suitable for storage of flowable substances including, but not limited to, liquid comestibles (such as beverages), oil, paint, grease, chemicals, suspensions of solids in liquid, and solid particulate matter (powders, grains, granular solids). Nonlimiting examples of suitable liquids include liquid personal care products such as shampoo, conditioner, liquid soap, lotion, gel, cream, balm, and sunscreen. Other suitable liquids include household care/cleaning products and automotive care products. Other liquids include liquid food such as condiments (ketchup, mustard, mayonnaise) and baby food.

The present flexible container is suitable for storage of flowable substances with higher viscosity and requiring application of a squeezing force to the container in order to discharge. Nonlimiting examples of such squeezable and flowable substances include grease, butter, margarine, soap, shampoo, animal feed, sauces, and baby food.

By way of example, and not limitation, examples of the present disclosure are provided.

EXAMPLES

Example 1

A flat sheet of ethylene/α-olefin multi-block copolymer, Infuse™ 9817 (density 0.875 g/cc and MI 15 g/10 min (2.16 Kg@190° C.)), available from The Dow Chemical Company is made by pressing pellets of the ethylene/α-olefin multi-block copolymer between non-stick sheets at 200° C. for 5 minutes at 3 Bar pressure. The resulting sheet has a thickness of 0.8 mm.

A circular section with a 12 mm diameter is cut from the sheet to form the flexible valve. A slit is cross cut into the section to form flaps for the flexible valve. The flexible valve is then inserted into the channel of a standard pre-formed fitment having a canoe-shaped base. The flexible valve is inserted into the fitment channel and attached with an adhesive.

The fitment base (canoe-shape base) is heat sealed to a 500 ml flexible polyethylene flexible pouch. The flexible pouch is filled to capacity with water and hung upside-down. Only a few drops of water pass through flexible valve after approximately one minute showing that the flexible valve is capable of retaining the fluid if no pressure is applied to the package.

Upon applying hand pressure to the flexible pouch, the entire liquid content of the flexible pouch is released through the flexible valve It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A fitment comprising:
(i) a top portion;
(ii) a base, and a channel extending through the top portion and the base for passage of a flowable material; and
(iii) a flexible valve extending across the channel and having a slit which opens to permit flow therethrough, the flexible valve comprising an ethylene/α-olefin multi-block copolymer consisting of an ethylene monomer and a $C_4$-$C_{12}$ α-olefin co-monomer.

2. The fitment of claim 1 wherein the top portion, the base, and the flexible valve each is composed of the ethylene/α-olefin multi-block copolymer.

3. The fitment of claim 2 wherein the base comprises a pair of opposing sidewalls, the sidewalls extending around the channel, the sidewalls joined together at opposing ends.

4. The fitment of claim 3 comprising at least one sealing rib extending along the sidewalls.

5. The fitment of claim 4 wherein the top portion, the base, the flexible valve, and the at least one sealing rib each comprise the ethylene/α-olefin multi-block copolymer.

6. The fitment of claim 3 wherein the sidewalls define a canoe-shape from bottom plan view.

7. The fitment of claim 1 wherein the flexible valve is integral to the fitment, and the fitment is composed of a single polymer that is the ethylene/α-olefin multi-block copolymer.

8. The fitment of claim 1 comprising an overmold component composed of the ethylene/α-olefin multi-block copolymer, and the flexible valve is an element of the overmold component.

9. The fitment of claim 8 wherein
the base comprises a pair of opposing sidewalls, the sidewalls extending around the channel, the sidewalls joined together at opposing ends; and
the overmold component further comprises at least one sealing rib adhered to the sidewalls, the sealing rib comprising the ethylene/α-olefin multi-block copolymer.

10. The fitment of claim 9 wherein the overmold component further comprises opposing winglets extending from each respective sidewall end, the winglets comprising the ethylene/α-olefin multi-block copolymer.

11. The fitment of claim 9 wherein the flexible valve and the at least one sealing rib are integral to each other;
and the flexible valve and the at least one sealing rib are composed the ethylene/α-olefin multi-block copolymer.

12. The fitment of claim 8 comprising a rigid component and the top portion and the base are elements of the rigid component.

13. The fitment of claim 1 wherein the base defines a circle shape from bottom plan view.

14. A flexible container comprising:
a first multilayer film and a second multilayer film, each multilayer film comprising a seal layer, the multilayer films arranged such that seal layers oppose each other and the second multilayer film is superimposed on the first multilayer film;
a fitment sandwiched between the first multilayer film and the second multilayer film, the fitment comprising
(i) a top portion,
(ii) a base and a channel extending through the top portion and the base for passage of a flowable material; and
(iii) a flexible valve extending across the channel and having a slit which opens to permit flow therethrough, the flexible valve comprising an ethylene/α-olefin multi-block copolymer consisting of an ethylene monomer and a $C_4$-$C_{12}$ α-olefin co-monomer; and
the base is sealed to the first multilayer film and the second multilayer film.

15. The flexible container of claim 14 wherein the slit opens to permit flow in response to a threshold internal pressure in the container.

16. The flexible container of claim 14 wherein the base defines a circle shape from bottom plan view.

17. The fitment of claim 14 wherein the the fitment is an integral component, the fitment formed from a single polymer that is the ethylene/α-olefin multi-block copolymer.

18. The fitment of claim 14 wherein the base comprises a pair of opposing sidewalls, the sidewalls extending around the channel, the sidewalls joined together at opposing ends; and at least one sealing rib extending along the sidewalls.

19. The flexible container of claim 14 wherein the flexible valve is located in the top portion of the fitment.

20. The fitment of claim 14 comprising an overmold component composed of the ethylene/α-olefin multi-block copolymer, and the flexible valve is an element of the overmold component.

\* \* \* \* \*